March 31, 1942.     S. FREY     2,277,752
ARTICLE OF FURNITURE
Filed May 12, 1939
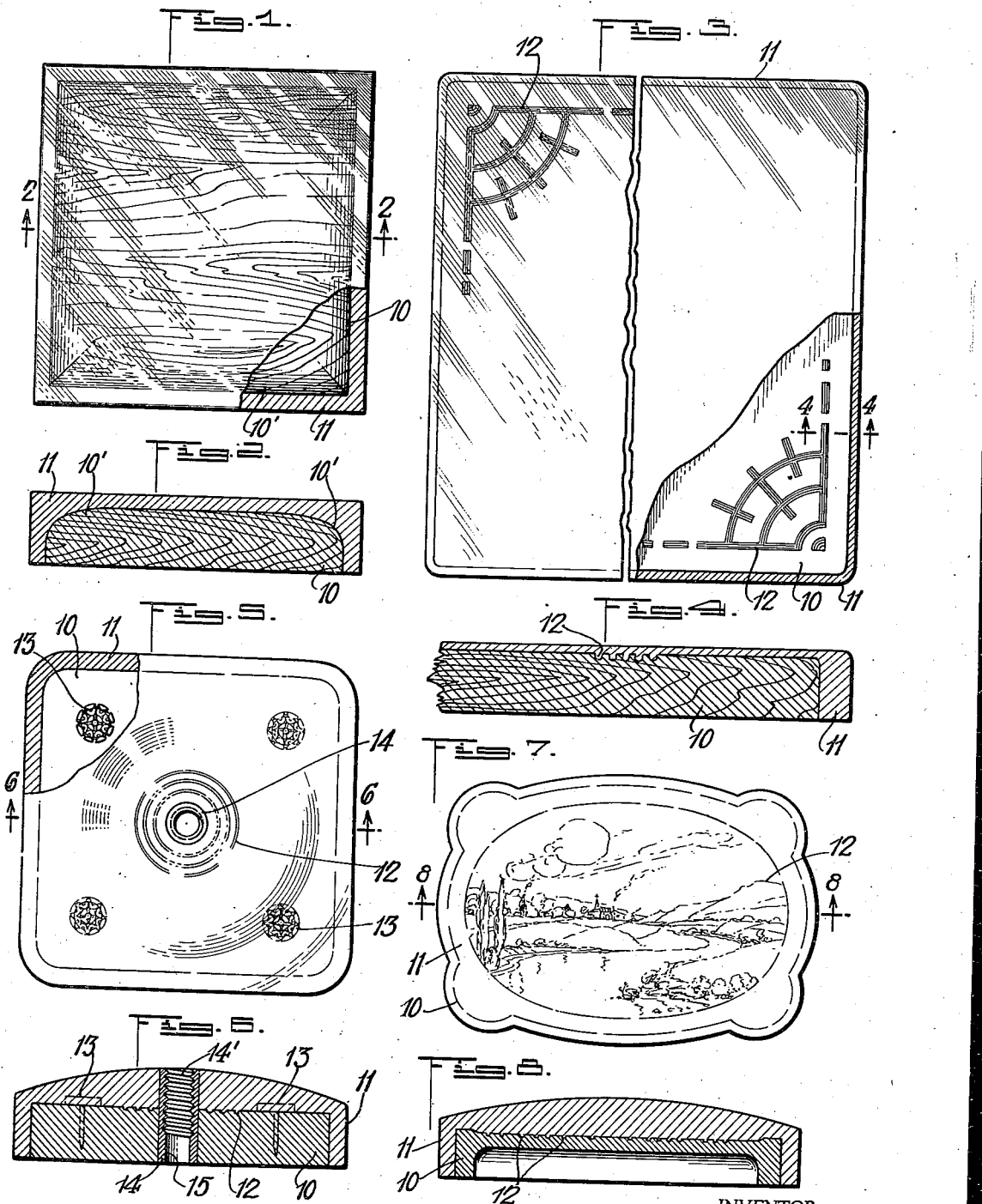
INVENTOR.
SAMUEL FREY.
BY Frank M. Ashley
ATTORNEY.

Patented Mar. 31, 1942

2,277,752

UNITED STATES PATENT OFFICE 2,277,752

ARTICLE OF FURNITURE

Samuel Frey, Brooklyn, N. Y.

Application May 12, 1939, Serial No. 273,165

1 Claim. (Cl. 311—106)

My invention relates to articles of furniture.

The object of my invention is to provide an article of furniture formed for uses such as lamp bases, table tops, and other such articles as are exposed to view in use, and comprises a casing of plastic material such as transparent resin, or translucent material that can be molded over a core of fibrous material such as wood or wood pulp, to serve as a strengthening portion and which may also be colored, or molded, or engraved, or otherwise formed to disclose a design formed in the core or mounted thereon and viewable thru the transparent casing portion.

A further object of my invention is to provide a base for use with lamps and other such furniture, with means inset in the base adapted to support a rod or tube on which a lamp may be mounted, in easily detachable relation, and which may also be used to support a central plate or image, etc. instead of a lamp, which will serve to cover the said supporting means.

The resins employed for the casing are preferably of the synthetic type such as the phenol-aldehyde and the urea base resins, which when heated may be caused to flow readily into a mold and caused to set, after which they are ready for use.

I am aware that the process of molding such plastic material is not new and that the plastic has been used to cover some articles of wood, such as pipes for smoking tobacco, and that those skilled in this art of molding plastics of this nature will be able to make my new articles without further information than is set forth in the following description.

Referring to the drawing which forms a part of the specifications:

Fig. 1 is a plan view of a block construction embodying my invention, a corner being shown in section to disclose a wooden core or plate that is visible thru the transparent casing portion.

Fig. 2 is a cross section view of Fig. 1, taken on line 2—2 thereof.

Fig. 3 is a view of a table showing a transparent casing, and a core of wood therein having corner parts that are ornamented by engraving, the depressions in the engraved part being filled by the plastic material in the act of molding the casing over the core.

Fig. 4 is a cross sectional view on line 4—4 of Fig. 3 shown on an enlarged scale.

Fig. 5 is a plan view of a block designed for use as a base for a lamp or other article such as a statue, a corner portion of the casing being removed to disclose a tack-like ornament.

Fig. 6 is a cross sectional view taken on line 6—6 of Fig. 5 showing the top surface of the plastic to be curved to form a lens, and also showing the means used to support an attachment located in the center of the block.

Fig. 7 is a plan view of a table having a core encased by transparent resin and its top ornamented and magnified by the casing.

Fig. 8 is a cross sectional view on line 8—8 of Fig. 7.

From the above description it will be understood that one of the objects of my invention is to provide an article of the character described that has a core portion ornamented and magnified to effect a pleasing ornamental appearance.

10— indicates a core portion of wood or other suitable material that may be engraved or otherwise ornamented, said ornamental portions being firmly embedded by the casing material in the act of molding said material over the core.

The core is first formed and finished prior to the casing being molded around it.

When the upper marginal portions of the core are curved as illustrated in Figs. 1 and 2 at 10'— and the casing is formed with a plane top and sides, the said marginal portions appear to be curved, due to the curved under side of the plastic over said curved portion, serving as a lens when viewed thru the thickened marginal portions of the plastic, and this construction increases the ornamental appearance of the block.

In Figs. 3 and 4 the ornamental features comprise the engraving 12— and the natural grain of the wood, both of which is enhanced by the brightening effect of the plastic which lends to the surfaces of the core and its ornamental parts, a varnished effect; also the tops when curved as illustrated in Fig. 8 serve to magnify the grain of the wood and exposed parts and impart a very ornamental appearance to the block.

In Figures 5 and 6, the tack-like elements 13— may be of metal and formed with designs in their exposed surfaces which greatly enrich the appearance of the blocks.

In Figures 5 and 6, 14— indicates a tube which extends thru the core and casing and is held by the casing material in the act of molding, firmly therein.

The tube is threaded as shown at 14'— and rests flush with the upper side of the casing, and with its lower end flush with the lower side of the core, and the lower end of the tube is not threaded and provides a smooth socket 15— to receive a top end of a pedestal on which it may be mounted, if desired.

The casing material is relatively expensive and is therefore preferably molded in a thin form to provide thin walls that are supported by the core, as will be readily understood.

In making the article, the core is placed in the mold designed to form the casing, and the plastic is heated and caused to flow around the top and sides of the core and conform to the engraving or other form of the surfaces thereof, but the under side of the core is not encased by the plastic.

When finished, the core is firmly held in integral relation with the casing and air is excluded from the top side of the core, therefore there is not oxidation of metal parts used in ornamentation.

Having thus described my invention I claim as new:

A table top comprising a core having substantially the shape and size of the finished top, the top surface of said core being embossed and indented to present an ornamental appearance, and a slab-like top layer of transparent resinous material integrally united with said top surface of said core, said top layer having a flat top surface and having a bottom surface conforming to the configuration of said core.

SAMUEL FREY.